(12) United States Patent
Kütt et al.

(10) Patent No.: US 8,111,687 B2
(45) Date of Patent: Feb. 7, 2012

(54) COMMUNICATION SYSTEM AND METHOD

(75) Inventors: Andres Kütt, Tallinn (EE);
Konstantinos Papamiltiadis, Notting Hill (GB)

(73) Assignee: Skype Limited, Dublin (IE)

( * ) Notice: Subject to any disclaimer, the term of this patent is extended or adjusted under 35 U.S.C. 154(b) by 1083 days.

(21) Appl. No.: 12/004,095

(22) Filed: Dec. 19, 2007

(65) Prior Publication Data
US 2008/0170677 A1 Jul. 17, 2008

(30) Foreign Application Priority Data
Dec. 20, 2006 (GB) .................................. 0625439.5

(51) Int. Cl.
*H04L 12/66* (2006.01)
*H04L 12/56* (2006.01)
*H04L 12/28* (2006.01)

(52) U.S. Cl. ... 370/352; 370/355; 370/401; 379/201.02; 379/211.02; 379/245

(58) Field of Classification Search ............. 379/142.01, 379/142.04, 142.06, 142.15, 242, 243, 245, 379/246, 201.02, 201.08, 201.12, 211.01, 379/211.02, 219, 221.01, 229, 230; 370/259, 370/352, 353, 354, 355, 356, 357, 400, 401
See application file for complete search history.

(56) References Cited

U.S. PATENT DOCUMENTS

| 7,466,810 B1 * | 12/2008 | Quon et al. ............. 379/201.01 |
| 2003/0076933 A1 | 4/2003 | Ranalli et al. |
| 2004/0160946 A1 | 8/2004 | Fowler |

(Continued)

FOREIGN PATENT DOCUMENTS
WO WO 2005/009019 A2 1/2005
(Continued)

OTHER PUBLICATIONS
EPO Office Action dated May 25, 2010, EP 07872467.1, 6 pp.
(Continued)

*Primary Examiner* — Binh Tieu
(74) *Attorney, Agent, or Firm* — Hamilton, Brook, Smith & Reynolds, P.C.

(57) ABSTRACT

A method of establishing communication between a first and second terminal, the first terminal being arranged to communicate with a first communication system and the second terminal being arranged to communicate with a second communication system. The method comprises the steps of: a user of the second terminal selecting an identity to represent the second terminal in the first communication system and registering a network address of the second terminal at a first storage means; allocating to the second terminal a calling identifier from a set of available calling identifiers and mapping the network address to the calling identifier at the first storage means and mapping the identity to the calling identifier at a second storage means; a user of the first terminal initiating communication with the second terminal using the identity; the first terminal translating the identity to the calling identifier using the second storage means and transmitting a message to the first communication system to initiate communication with the second terminal using the calling identifier; responsive to receiving the message at a network node of the first communication system, the network node translating the calling identifier to the network address using the first storage means; and establishing a connection between the first terminal and the network node over the first communication system, and between the network node and the second terminal over the second communication system.

18 Claims, 7 Drawing Sheets

U.S. PATENT DOCUMENTS

| | | | |
|---|---|---|---|
| 2008/0089506 A1* | 4/2008 | Pounds et al. | 379/218.01 |
| 2008/0313265 A1* | 12/2008 | Pounds et al. | 709/202 |
| 2010/0195811 A1* | 8/2010 | Beckemeyer | 379/201.12 |
| 2010/0208634 A1* | 8/2010 | Eng et al. | 370/310 |

FOREIGN PATENT DOCUMENTS

| | | |
|---|---|---|
| WO | WO 2006/072950 A2 | 7/2006 |
| WO | WO 2006/088402 A1 | 8/2006 |

OTHER PUBLICATIONS

Notification of Transmittal of the International Search Report and the Written Opinion of the International Searching Authority, or the Declaration, for PCT/IB2007/004474, 12 pp., date of mailing Oct. 28, 2008.

Keating, T., "SIP to Skype Gateway Breaks Skype's Great Wall of VoIP," Blog Entry, 3 pp. (Feb. 2006).

* cited by examiner

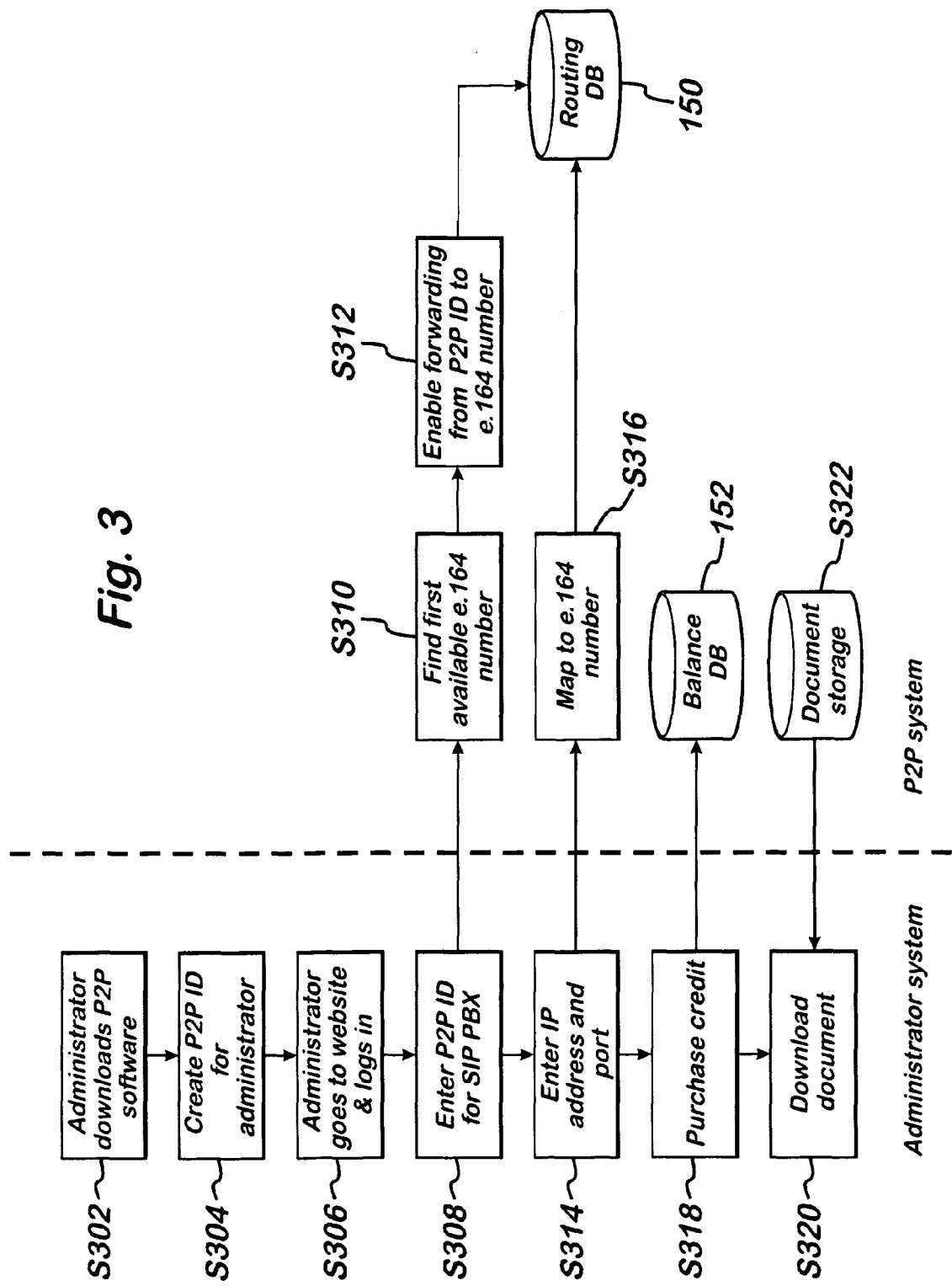

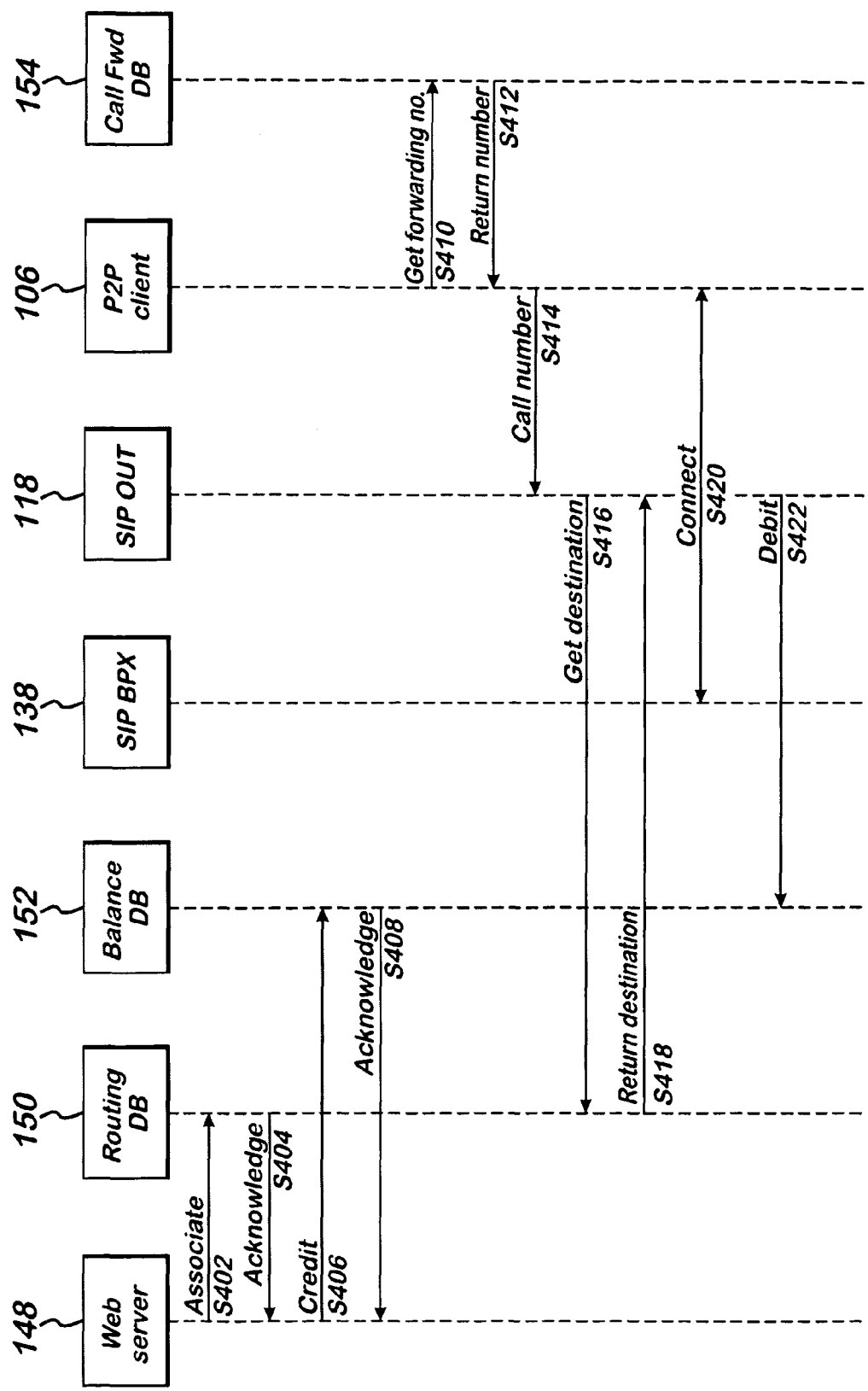

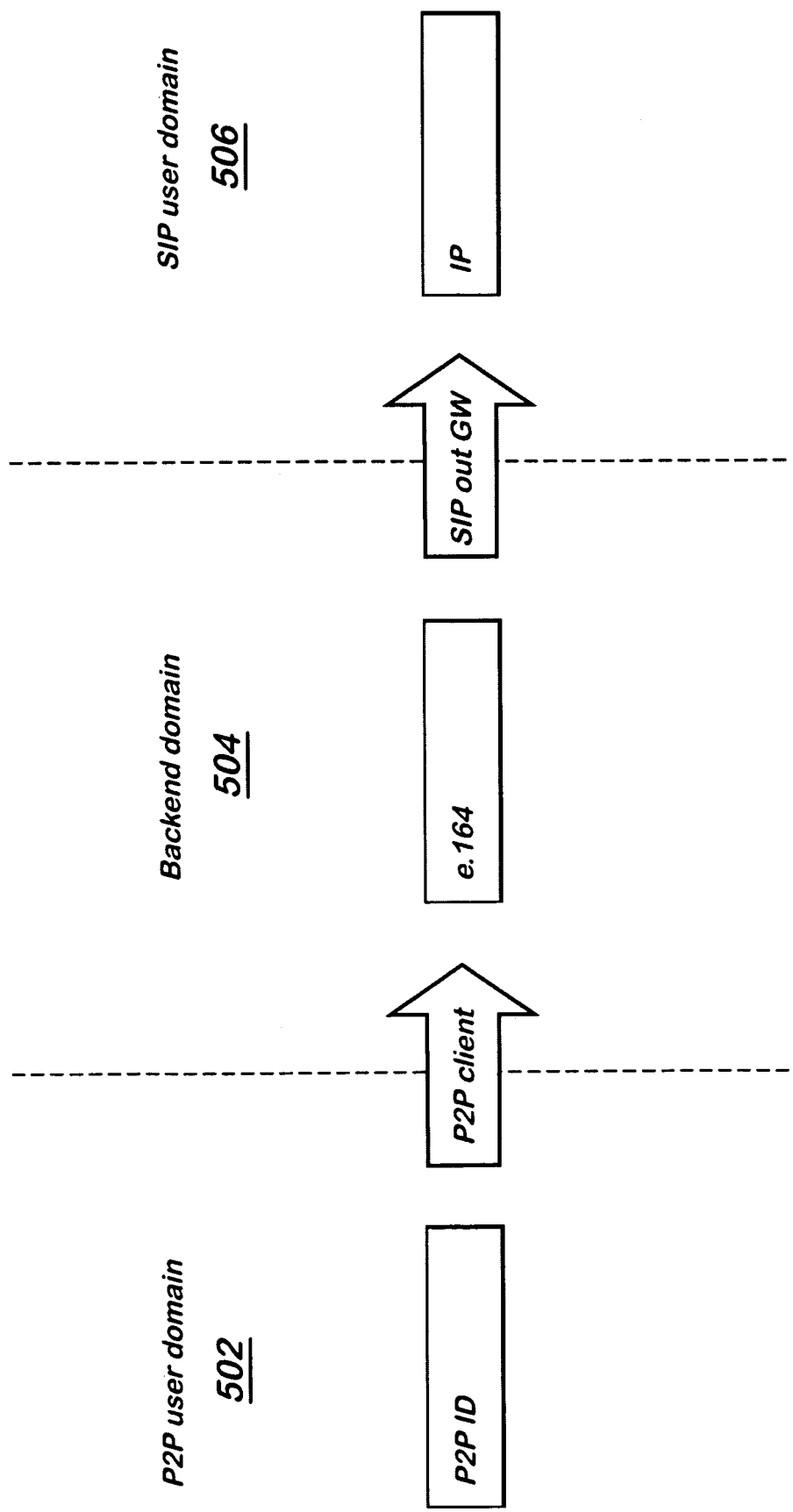

COMMUNICATION SYSTEM AND METHOD

RELATED APPLICATION

This application claims priority under 35 U.S.C. § 119 or 365 to Great Britain, Application No. 0625439.5, filed Dec. 20, 2006. The entire teachings of the above application are incorporated herein by reference.

TECHNICAL FIELD

This invention relates to a communication system and method, particularly but not exclusively for enabling interoperability between peer-to-peer and session initiation protocol communications systems.

BACKGROUND

Internet protocol (IP) based communication systems allow the user of a device, such as a personal computer, to make calls across a computer network such as the Internet. These systems are beneficial to the user as they are often of significantly lower cost than traditional telephony networks, such as fixed line or mobile networks. This may particularly be the case for long distance voice calls. These systems may utilise voice over internet protocol ("VoIP") over an existing network (e.g. the Internet) to provide these services, although alternative protocols can also be used. These systems may also provide further services such as video calling and instant messaging ("IM").

Two main types of IP-based communication systems operate today. The first operates using a peer-to-peer ("P2P") topology built on proprietary protocols. An example of this type of communication system is the Skype™ system. To use a peer-to-peer service, the user must install and execute client software on their PC, and register with the P2P system. When the user registers with the P2P system the client software is provided with a digital certificate from a central server. Once the client software has been provided with the certificate calls can subsequently be set up and routed between users of the P2P without the further use of a central server. The client software provides the VoIP and IM connections. It is therefore a characteristic of peer-to-peer communication that the call is not routed using the central server but directly from end-user to end-user. Further details on such a P2P system are disclosed in WO 2005/009019.

The second main type of IP-based communication system is based on the session initiation protocol ("SIP"). SIP is a communications signalling protocol developed by the Internet Engineering Task Force ("IETF") and is a proposed standard for initiating, modifying and terminating an interactive user session that involves multimedia elements such as voice, video and IM. SIP is the leading signalling protocol for VoIP. SIP is described in IETF RFC 3261. A user of a SIP service is generally provided with either a telephone number (of the known e.164 format) or a SIP uniform resource identifier ("URI") (of the form SIP:username@example.com). To call a SIP user, the caller uses the SIP:URI or e.164 number to identify the SIP user, and this is translated to the IP addresses of the called user's terminal by a registrar database.

SUMMARY

A problem with the two above-identified types of IP-based communication systems is that, although they both use the Internet and IP to communicate, there is no direct interoperability between the systems. Therefore, a user of the P2P system cannot call a user of the SIP system directly (or vice versa), using only the Internet. Instead, the call can only be connected if an e.164 number is allocated to the user being called, and in this case the call is routed from the Internet, into the public switched telephone network ("PSTN") before being routed back into the Internet. This causes problems with trans-coding of the signals and latency, as well as costs associated with the use of the PSTN.

There is therefore a need for a technique to address the aforementioned problems with interoperability between P2P and SIP-based communication systems.

According to one aspect of the present invention there is provided a method of establishing communication between a first and second terminal, said first terminal being arranged to communicate with a first communication system and said second terminal being arranged to communicate with a second communication system, comprising the steps of:

a user of said second terminal selecting an identity to represent the second terminal in the first communication system and registering a network address of the second terminal at a first storage means;

allocating to the second terminal a calling identifier from a set of available calling identifiers and mapping the network address to said calling identifier at the first storage means and mapping the identity to the calling identifier at a second storage means;

a user of said first terminal initiating communication with said second terminal using said identity;

said first terminal translating said identity to said calling identifier using said second storage means and transmitting a message to the first communication system to initiate communication with said second terminal using said calling identifier;

responsive to receiving said message at a network node of the first communication system, said network node translating said calling identifier to said network address using said first storage means; and establishing a connection between said first terminal and said network node over the first communication system, and between said network node and said second terminal over the second communication system.

Preferably, the first communication system is a peer-to-peer communication system. Preferably, the second communication system is a session initiation protocol communication system.

According to one embodiment, the step of initiating communication with said second terminal comprises the user of said first terminal activating a hyperlink containing said identity displayed on a display of said first terminal. According to another embodiment, the step of initiating communication with said second terminal comprises the user of said first terminal selecting said identity shown in a contact list displayed on a display of said first terminal.

Preferably, the calling identifier is an e.164 number. Preferably, the communication between the first and second terminal is a voice call.

Preferably, the step of selecting an identity to represent the second terminal in the first communication system comprises the user of said second terminal viewing a website and entering said identity in said website. Preferably, the step of registering a network address of the second terminal at a first storage means comprises the user of the second terminal entering said network address in said website, and said website communicating said network address to said first storage means.

According to another aspect of the present invention there is provided a system for establishing communication between a first and second terminal, said first terminal being arranged to communicate with a first communication system and said second terminal being arranged to communicate with a second communication system, comprising:

means for selecting an identity to represent the second terminal in the first communication system and means for registering a network address of the second terminal at a first storage means;

means for allocating to the second terminal a calling identifier from a set of available calling identifiers and means for mapping the network address to said calling identifier at the first storage means and means for mapping the identity to the calling identifier at a second storage means;

said first terminal comprising means for initiating communication with said second terminal using said identity, means for translating said identity to said calling identifier using said second storage means and means for transmitting a message to the first communication system to initiate communication with said second terminal using said calling identifier; and a network node of the first communication system comprising means for translating said calling identifier to said network address using said first storage means responsive to receiving said message at the network node, and means for establishing a connection between said first terminal and said network node over the first communication system, and between said network node and said second terminal over the second communication system.

Preferably, the first communication system is a peer-to-peer communication system. Preferably, the second communication system is a session initiation protocol communication system.

According to one embodiment, the means for initiating communication with said second terminal using said identity comprises a display means arranged to display a hyperlink containing said identity and a selection means, operable by a user of said first terminal, for activating said hyperlink. According to another embodiment, the means for initiating communication with said second terminal using said identity comprises a display means arranged to display a contact list containing said identity and a selection means, operable by a user of said first terminal, for selecting said identity from said contact list.

Preferably, the calling identifier is an e.164 number. Preferably, the communication between the first and second terminal is a voice call.

Preferably, the means for selecting an identity to represent the second terminal in the first communication system comprises means for displaying a website to a user of said second terminal, said website being arranged to receive the identity entered by the user of said second terminal. Preferably, the means for registering a network address of the second terminal at a first storage means comprises means for entering said network address in said website, and means for communicating said network address from said website to said first storage means.

BRIEF DESCRIPTION OF THE DRAWINGS

For a better understanding of the present invention and to show how the same may be put into effect, reference will now be made, by way of example, to the following drawings in which:

FIG. 3 shows a flowchart of a process to enable a SIP terminal to be contacted by a P2P client;

FIG. 4 shows a process by which a call can be made from a P2P client to a SIP terminal;

FIG. 5 shows the translation of addressing of call set-up messages across multiple domains.

DETAILED DESCRIPTION

Figure 1:
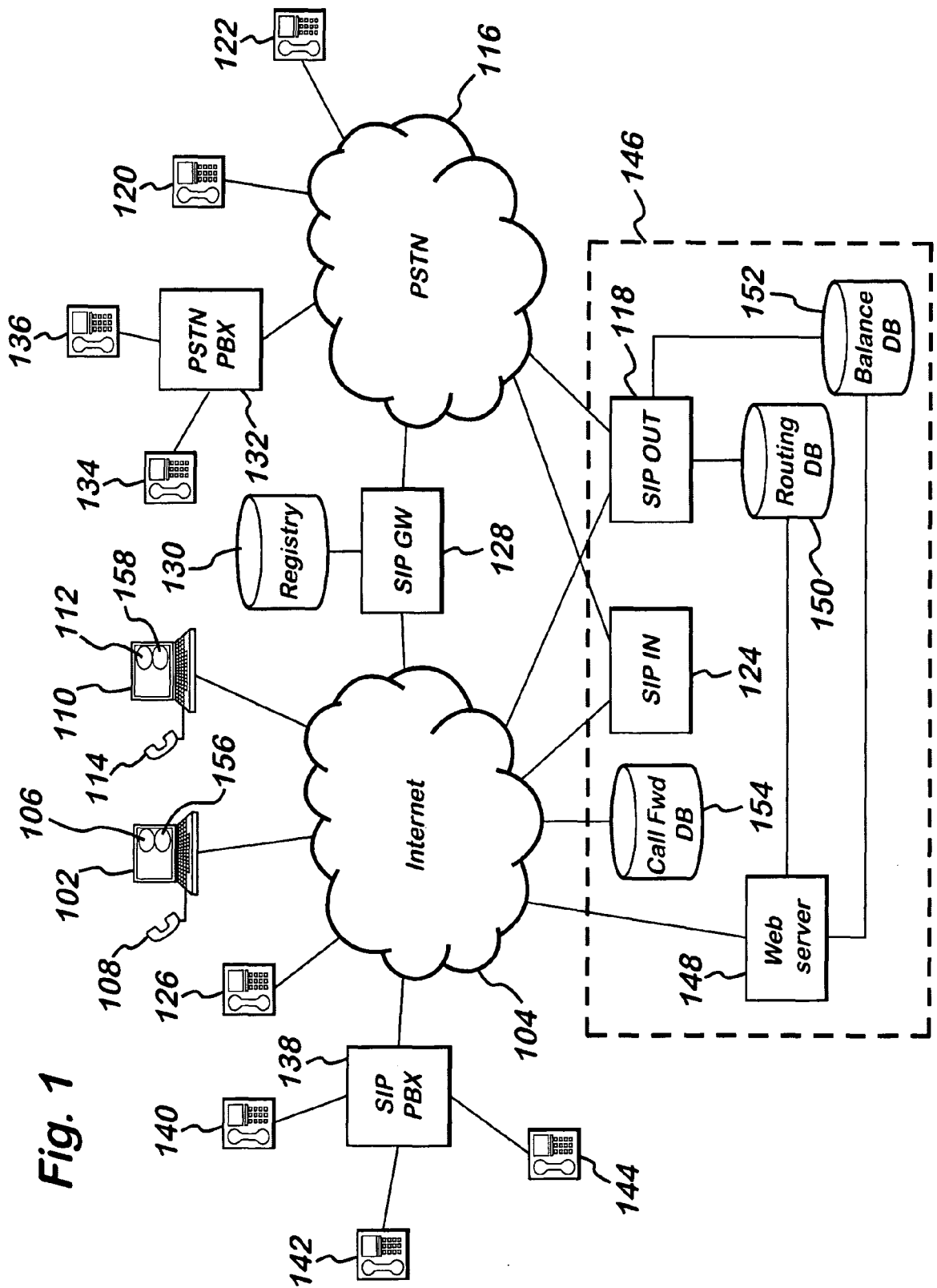
FIG. 1 shows a communication system comprising P2P, SIP and PSTN users.

Reference is first made to FIG. 1, which illustrates a communication system comprising P2P, SIP and PSTN users.

FIG. 1 is first used to illustrate the known techniques by which a P2P user can make a call to another P2P user or PSTN user, before illustrating how calls are made from a P2P user to a SIP user.

The user of the P2P communication system operates a user terminal 102, which is shown connected to a network 104, such as the Internet. The user terminal 102 may be, for example, a personal computer ("PC"), personal digital assistant ("PDA"), a mobile phone or embedded device able to connect to the network 104. The user terminal 102 can be connected to the network 104 via a cable (wired) connection or a wireless connection. The user terminal 104 is running a client 106, provided by the operator of the peer-to-peer communication system. The client 106 is a software program executed on a local processor in the user terminal 102. The user terminal 102 is also connected to a handset 108, which comprises a speaker and microphone to enable the user to listen and speak in a voice call in the same manner as with traditional fixed-line telephony. The handset 108 does not necessarily have to be in the form of a traditional telephone handset, but can be in the form of a headphone or earphone with an integrated microphone, or as a separate loudspeaker and microphone independently connected to the user terminal 102.

Figure 2A:
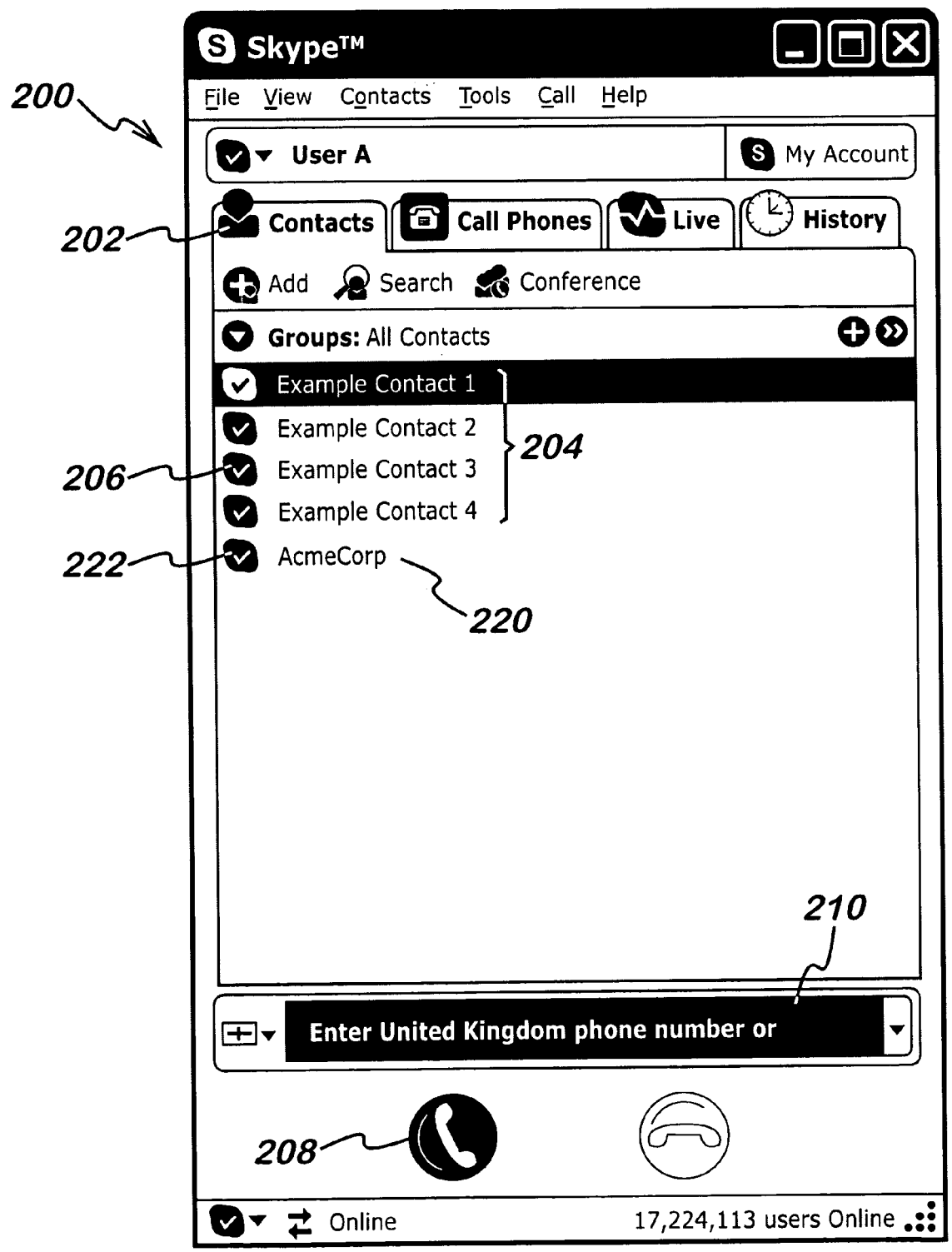
FIGS. 2A-2B shows a user interface for a P2P client.

An example of a user interface 200 of the client 106 executed the user terminal 102 is shown illustrated in FIG. 2A. The client user interface 200 comprises a tab 202 labeled "contacts", and when this tab is selected the contacts stored by the user in a contact list are displayed. In the example user interface in FIG. 2A, four contacts of other users of the P2P system are shown listed at 204. Each of these contacts have authorised the user of the client 106 to view their contact details and online presence information. Each contact in the contact list has a presence status icon associated with it. For example, the presence status icon for "Example Contact 3" is labeled 206. The presence status icon indicates the contact's presence state, for example whether the contact is online, offline, busy, away, has voicemail active, or whether call forwarding to another number is active.

Calls to these other P2P users in the contact list may be initiated over the P2P system by selecting the contact and clicking on a "call" button 208 using a pointing device. Alternatively, the P2P ID of a contact may be initiated by typing in the P2P ID in the field 210. The call set-up is performed using proprietary protocols, and the route over the Internet 104 between the calling user and called user is determined by the peer-to-peer system without the use of central servers. Following authentication through the presentation of digital certificates (to prove that the users are genuine subscribers of the P2P system—described in more detail in WO 2005/009019), the call can be made using VoIP. The client performs the encoding and decoding of VoIP packets. VoIP packets from the user terminal 102 are transmitted into the Internet 104, and routed by the P2P system to the computer terminal 110 of the other P2P user. A client 112 (similar to the client 106) running on the user terminal 110 of the other P2P user decodes the VoIP packets to produce an audio signal that can be heard by the other user using the handset 114. Conversely, when the other user talks into handset 114, the client 112 executed on user terminal 110 encodes the audio signals into VoIP packets and transmits them across the Internet 104 to the user terminal 102. The client 106 executed on user terminal 102 decodes the VoIP packets from the other P2P user, and produces an audio signal that can be heard by the user of the handset 108.

The VoIP packets for the P2P call described above are passed across the Internet only, and the PSTN network is not involved. Furthermore, due to the P2P nature of the network, the voice calls between users of the P2P network can be made with no central servers being used (central servers are only required at initial registration and authentication for calls between P2P users). This has the advantages that the network scales easily and maintains a high voice quality, and the call can be made free to the users.

Figure 2B:
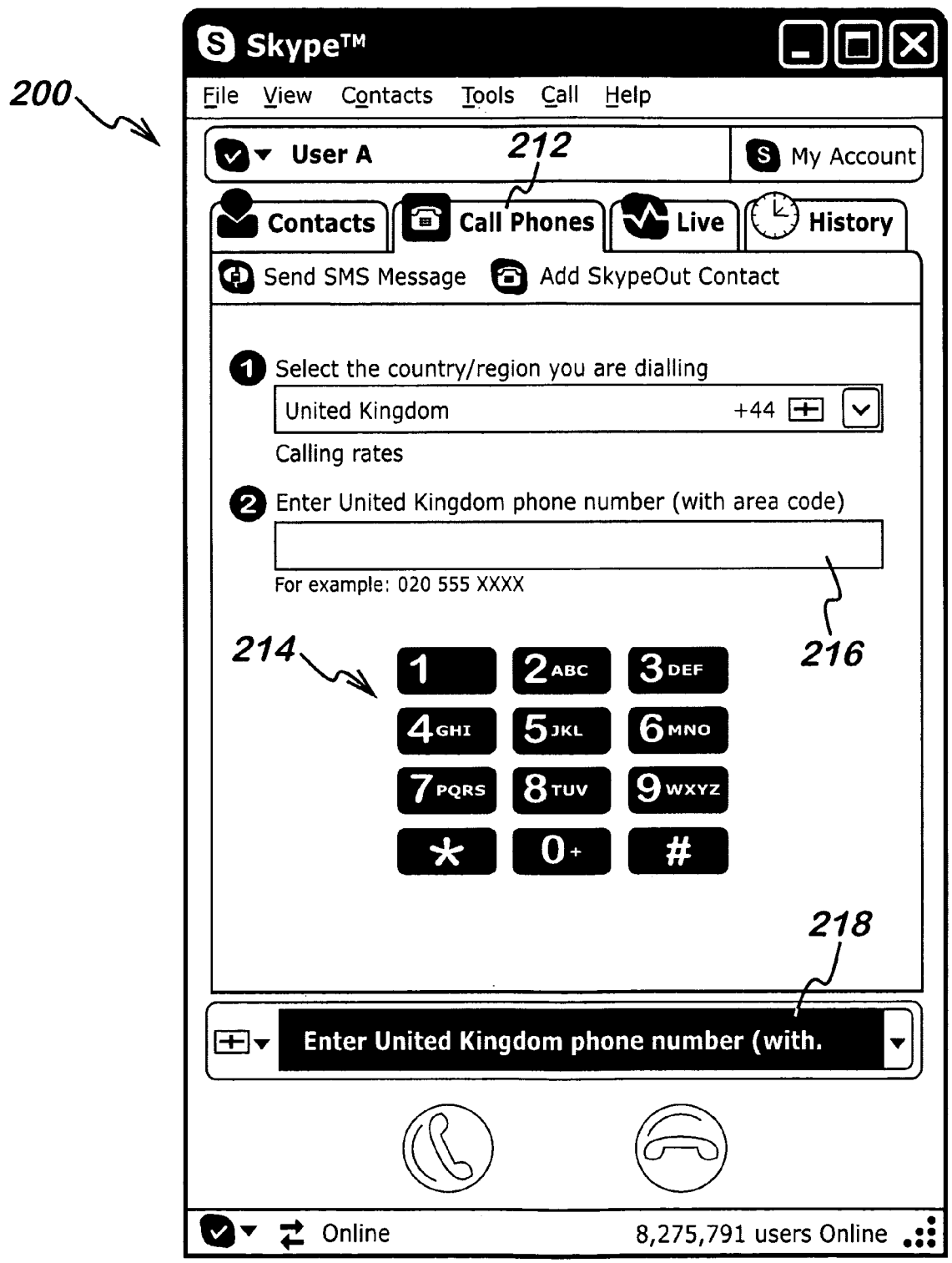

Alternatively, the P2P user of the user terminal 102 can make a voice call to a user of a fixed-line telephone service. The user interface 200 of the client 106 for making fixed-line telephone calls is shown in FIG. 2B. In this case, the user selects the tab 212 labeled "Call Phones". The user is displayed a keypad 214, which the user can use to type in a telephone number of another user connected to the public switched telephone network ("PSTN") 116 using a pointing device. Alternatively, the user can type the telephone number directly into field 216 or 218 using a keyboard.

When the call is being set up, because the destination of the call is a PSTN number, the P2P system routes the call set-up messages to a SIP OUT gateway ("GW") 118, operated by the operator of the P2P system and connected between the Internet 104 and the PSTN 116. A connection is then established between the SIP OUT GW 118 and the PSTN destination telephone using the telephone number entered by the P2P user, for example using signalling system #7 ("SS7") to switch between exchanges. When the call is established and answered, the client encodes the audio signals from the user as VoIP packets and these are transmitted into the Internet 104. The VoIP packets are individually addressed IP packets, and the P2P system routes these to the SIP OUT GW 118. At the SIP OUT GW 118, the VoIP packets are decoded and the audio signals transmitted across the established circuit-switched PSTN connection. The PSTN 116 delivers the converted voice information from the SIP OUT GW 118 to the fixed-line telephone equipment 120 of the PSTN user. Note that the user could also make calls to a mobile telephone, instead of to fixed line equipment (not illustrated in FIG. 1). Due to the fact that the call must be routed over the PSTN 116, these calls from a P2P user to a PSTN user are not free.

Similarly, a call can be made from a PSTN terminal, such as fixed-line telephone equipment 122 to a user of the P2P system. For this to be achieved, the user of the P2P system must be assigned an e.164 number. The PSTN user of equipment 122 dials the e.164 number of the P2P user, and the call is switched over the PSTN 116 to a SIP IN GW 124, operated by the operator of the P2P system. The SIP IN GW translates the e.164 number to a P2P identity, and the call is routed over the P2P system using the identity to the user terminal 102.

In summary, techniques are known for efficiently connecting calls between multiple P2P users, and between P2P users and PSTN users. However, known systems cannot connect calls between P2P users and SIP users in an efficient manner. If a SIP user is identified by only a SIP:URI or an IP address, then the P2P user of the user terminal 102 is not able to call the SIP user using the P2P system. This is because the client 106 running on user terminal 102 can only call contacts identified by either a P2P ID or a PSTN number. The client 106 does not act as a SIP client, only as P2P client.

If, however, the SIP user is identified by an e.164 number, then the SIP user may be contacted using the P2P system, albeit by a sub-optimal route. A P2P user of user terminal 102 can initiate a voice call to a SIP user terminal 126 that is also connected to the Internet 104 and allocated an e.164 number by typing in the e.164 number for the SIP user into the client 106. As the P2P system recognises the e.164 number as a telephone number, and not a P2P ID, it is routed to the SIP OUT GW 118 as if it were a PSTN call. The call is then passed to the PSTN 116. The PSTN 116 will determine the provider of the number, and route the call to a SIP GW 128. Note that the SIP GW 128 is not operated by the P2P operator, but by a third party or the SIP service provider for the user of terminal 126 (note that the elements of the system operated by the P2P operator in FIG. 1 are indicated by the dashed-line region 146). The SIP GW 128 translates the e.164 number of the SIP user to an IP address of the SIP terminal 126. To do this, the SIP GW 128 may consult a registry 130, which may be operated by a third party or the SIP service provider for the user of terminal 126. The call is then re-routed back to the Internet 104, and ultimately connected to the SIP terminal 126.

Therefore, even though both the P2P and SIP systems are IP-based, there is a portion of the call routed over the PSTN. This can give rise to problems with trans-coding of the signals and latency, due to the multiple gateways through which the call passes. In addition, these calls cannot be offered to the user for free, as there is a cost associated with the use of the PSTN.

An embodiment of the invention is now described which allows calls to be made from the P2P system to a SIP terminal without any of the above-mentioned disadvantages.

This embodiment is illustrated with a specific example scenario. However, it will be appreciated by the skilled person that the technique described may be applied more widely to any scenario in which a SIP user wishes to be contactable by the P2P system.

The illustrative scenario for this embodiment is where a company wants to enable calls from the P2P system to be made to their call centres. This is advantageous to the company for a number of reasons. Firstly, the company may want a user to be able to contact them for free. This may normally be achieved by the company purchasing a toll-free PSTN number. However, whilst this may allow the users to contact the company for free, it can be very expensive for the company as they need to pay for the calls made. Conversely, calls that use the P2P system are much cheaper. Secondly, by enabling calls from the P2P system to their call centres, the company can place a button on their website that allows them to be called directly, simply by the user clicking the button, without the user needing to type any information into a keypad or client.

However, the problem is that call centres generally operate using a private branch exchange ("PBX"). This allows a caller to be connected to a central number, and from there the call can be connected to one of a plurality of terminals of representatives within the call centre. The connecting of calls to representatives at the PBX may be performed manually by an operator (e.g. a receptionist) or using an automated service such an interactive voice response ("IVR") server. PBXs commonly connect to the PSTN, such as the PSTN PBX 132 illustrated in FIG. 1, connected to terminals 134 and 136. These PBXs obviously cannot be called for free from the P2P network, as the call must be routed over the PSTN. However, many PBXs can also connect to the Internet to receive VoIP calls using SIP, such as the SIP PBX 138 illustrated in FIG. 1, connected to terminals 140-144. The SIP PBX 138 may be integrated with a PSTN PBX, such as 132. Alternatively, the SIP PBX 138 may be a stand-alone unit.

Therefore, as many existing call centres already have the capability to be called over the Internet using SIP, it is advantageous to enable these call centres to be contactable using the P2P system without the need to utilise the PSTN network.

The first stage in enabling the SIP PBX 138 to be contactable by the P2P system is for the administrator of the SIP PBX 138 to register and configure his details with the P2P operator. This process is illustrated by the flowchart shown in FIG. 3.

In step S302 of FIG. 3, the administrator of the SIP PBX 138 downloads the P2P client software, and, in step S304, uses this to create a P2P system identity to be used by the administrator. If the administrator already has a P2P ID, then steps S302 and S304 can be skipped. In step S306 the administrator uses a web browser to navigate to a website operated by the P2P operator (hosted on webserver 148 in FIG. 1), and logs into this website using the P2P ID created in step S304.

In step S308, the administrator enters into the website a P2P ID chosen to identify the SIP PBX. This identity is in the form of a username, and may be chosen to reflect the name of the company whose PBX is being registered (e.g. the P2P ID may be "AcmeCorp"). Entering this P2P ID into the website triggers the P2P system to find an available, free, e.164 number that can be allocated to this P2P ID in step S310. The P2P system searches a pool for the first available (i.e. unused) number.

In step S312, the P2P system enables call forwarding between the P2P ID for the SIP PBX and the allocated e.164 number. This activates a rule in the P2P system, such that calls to the P2P ID are forwarded to the e.164 number. This is achieved by changing the presence status associated with the P2P ID to show call forwarding is active. The e.164 number to which the call is to be forwarded is stored in a call forwarding database 154 (as shown in FIG. 1), and this database can be interrogated by the P2P client 106 (as described hereinafter). The allocated e.164 number is then stored in a routing database ("DB") 150 that is operated by the P2P operator (as illustrated by routing DB 150 being within region 146 in FIG. 1).

In step S314, the administrator is prompted to enter the IP address and (if required) the port number for the SIP PBX 138 into a field on the website. The administrator enters this information and submits it. In step S316, the entered IP address information is mapped to the e.164 number and stored in the routing DB 150.

In step S318, the administrator is prompted to purchase credit, in order to pay for the use of the service, and the amount of credit available to the administrator is stored in a balance database 152 (also illustrated in FIG. 1) operated by the P2P system operator. Note that the purchasing of credit may not be required if the administrator already has a credited account with the P2P operator, or if the P2P operator offers the service for free. Once credit has been purchased, the administrator is prompted in step S320 to download a document containing instructions on using the service from a document store in step S322. This document can be displayed to the user, or saved for viewing later.

Following the steps outlined in FIG. 3, the SIP PBX information has been registered, and the P2P system is able to make calls to the SIP PBX over the Internet, as outlined below.

Reference is now made to FIG. 4, which illustrates the process by which a call can be made from a P2P client 106 to a SIP PBX 138. Step S402-408 summarises the process outlined with reference to FIG. 3, whereby, in step S402 the webserver 148 passes the IP address of the SIP PBX 138 to the routing DB 150. When the association process is complete, an acknowledgment is returned to the webserver 148 in step S404. S406 illustrates the webserver 148 sending a message to the balance DB 152 to credit the account of the administrator (if this is required, as in S318 of FIG. 3), and this is acknowledged in step S408. Note that the webserver 148 is shown as part of the system operated by the P2P operator (as indicated in FIG. 1 by the dashed-line region 146). In alternative embodiments, the webserver can be operated by a different operator, but the content of the webserver is provided by the P2P operator.

In step S410 the P2P client 106 begins the process of initiating a call to the SIP PBX 138. This can be achieved by the user clicking on a "call" link in a webpage that contains the P2P ID for the PBX, which triggers the client 106 to initiate a call to the P2P ID of the SIP PBX. Alternatively, the call can be initiated by the user adding the P2P ID for the SIP PBX to his contact list in the client 106, and selecting to call this contact. This is illustrated in FIG. 2A, where the contact list in user interface 200 shows a contact 220 with the name of "AcmeCorp". This corresponds to the P2P ID for the PBX as defined in step S308 of FIG. 3. The user can set up a call to "AcmeCorp" by selecting the contact and clicking the call button 208. Alternatively, the user can type the P2P ID "AcmeCorp" for the SIP PBX into the search field 210 in the client 106, and select an option to call the P2P ID.

The presence status of the P2P ID of the SIP PBX is indicated by icon 222. Although the presence status of the contact is always set to call forwarding, the icons for this type of contact are specifically set to show the presence status to be an online contact. This is because the end user of the client 106 does not need to know that the call is being forwarded to a e.164 number. In fact it is advantageous for the end user not to know the call is being forwarded, as this may give the incorrect impression that the user will have to pay for a PSTN call, whereas in fact the call would be free (as the PSTN is not used).

Whilst the call forwarding is hidden from the end user of the user interface 200, the P2P client 106 recognises the presence status of the P2P ID for the SIP PBX as having a call forwarding rule associated with it. In particular, as stated with regards to step S312 of FIG. 3, the P2P ID is forwarded to the allocated e.164 number. Therefore, as the client initiates a call to the P2P ID, the first step is for the client to determine the allocated e.164 number to which the call should be forwarded. In step S410 the P2P client 106 interrogated the call forwarding DB 154 to determine the e.164 number to which the P2P ID should be forwarded. This information is returned to the P2P client 106 in step S412. Note that the call forwarding is performed without the knowledge of the user of the P2P client 106, who is only aware of calling the P2P ID for the PBX.

In step S414, the P2P client 106 initiates the process of establishing a call to the determined e.164 number. As the call is being made to an e.164 number (as opposed to a P2P ID), the P2P system routes the call to the SIP OUT GW 118, as shown in step S414. This is because, as far as the P2P system knows at this stage, a PSTN number is being called. When the call reaches the SIP OUT GW 118, the SIP OUT GW 118 analyses the type of e.164 number (for example which range of numbers it is from) in order to determine where it should be routed next. In this case, the SIP OUT GW 118 determines that this e.164 number is used for a SIP endpoint, and should therefore not be routed into the PSTN network 116.

As the SIP OUT GW 118 has determined that the e.164 number is associated with a SIP endpoint, the SIP OUT GW 118 must determine the IP address of the SIP PBX 138. To do this, the SIP OUT GW 118 sends a message comprising the e.164 number in step S416 to the routing DB 150, requesting the IP address of the destination (i.e. the SIP PBX 138). The IP address is looked up in the routing DB 150, and then passed to the SIP OUT GW 118 in step S418.

The SIP OUT GW 118 can then connect the call between the P2P client 106 and the SIP PBX 138 in step S420. This is performed such that the connection between the P2P client and the SIP OUT GW 118 is a P2P connection using the P2P system, and the connection between the SIP OUT GW 118 and the SIP PBX 138 is a SIP connection set up by the SIP OUT GW 118 using the IP address obtained from the routing DB 150.

The user of the P2P client 106 can then talk to the SIP PBX 138, as if the SIP PBX were another user of the P2P system. The P2P user is not aware of either the e.164 number used for the call forwarding or the IP address of the SIP PBX. Once the P2P user is connected to the SIP PBX 138, then the call can be further directed to other terminals connected to the PBX according to known techniques.

The SIP OUT GW 118 tracks the call according to predetermined tracking requirements. For example, in step S422, when the call is completed the SIP OUT GW 118 reports to the balance DB 152 the length of the call, such that the balance DB 152 can determine how much the operator of the PBX should be charged for the call made, and deduct the appropriate amount from the operator's balance.

Reference is now made to FIG. 5, which summarises the changes in the identifiers used in the messages transmitted when setting up a call between a P2P client 106 and a SIP PBX 138 over the different domains of the system. First domain is the P2P user domain 502. This is the domain that the end user of the P2P system is exposed to. In the user domain 502, the SIP PBX 138 is identified solely by its P2P ID. The next domain is the backend domain 504. This corresponds to the domain in which communication occurs between the P2P client 106 and the SIP OUT GW 118. This domain is entirely "back-end" as it is shielded from any of the users of the system and the operators of the SIP PBX. In the backend domain the SIP PBX is identified by the allocated e.164 number. The P2P ID is translated to an e.164 number by the P2P client 106 (by interrogating the call forwarding DB 154), and the e.164 number is used for establishing the call between the P2P client 106 and the SIP OUT GW 118. The third domain is the SIP user domain 506, and this is the domain in which the SIP PBX 138 operates. The identifier used in the SIP user domain is the IP address, and the SIP OUT GW 118 translates the e. 164 number to the IP address by looking up the IP address in the routing DB 150. The IP address is used in establishing the call between the SIP OUT GW 118 and the SIP PBX 138. The transition and subsequent translation of identifiers through the three separate domains allows a call to be established between the user of the P2P system and the operator of the SIP PBX seamlessly.

Figure 6:
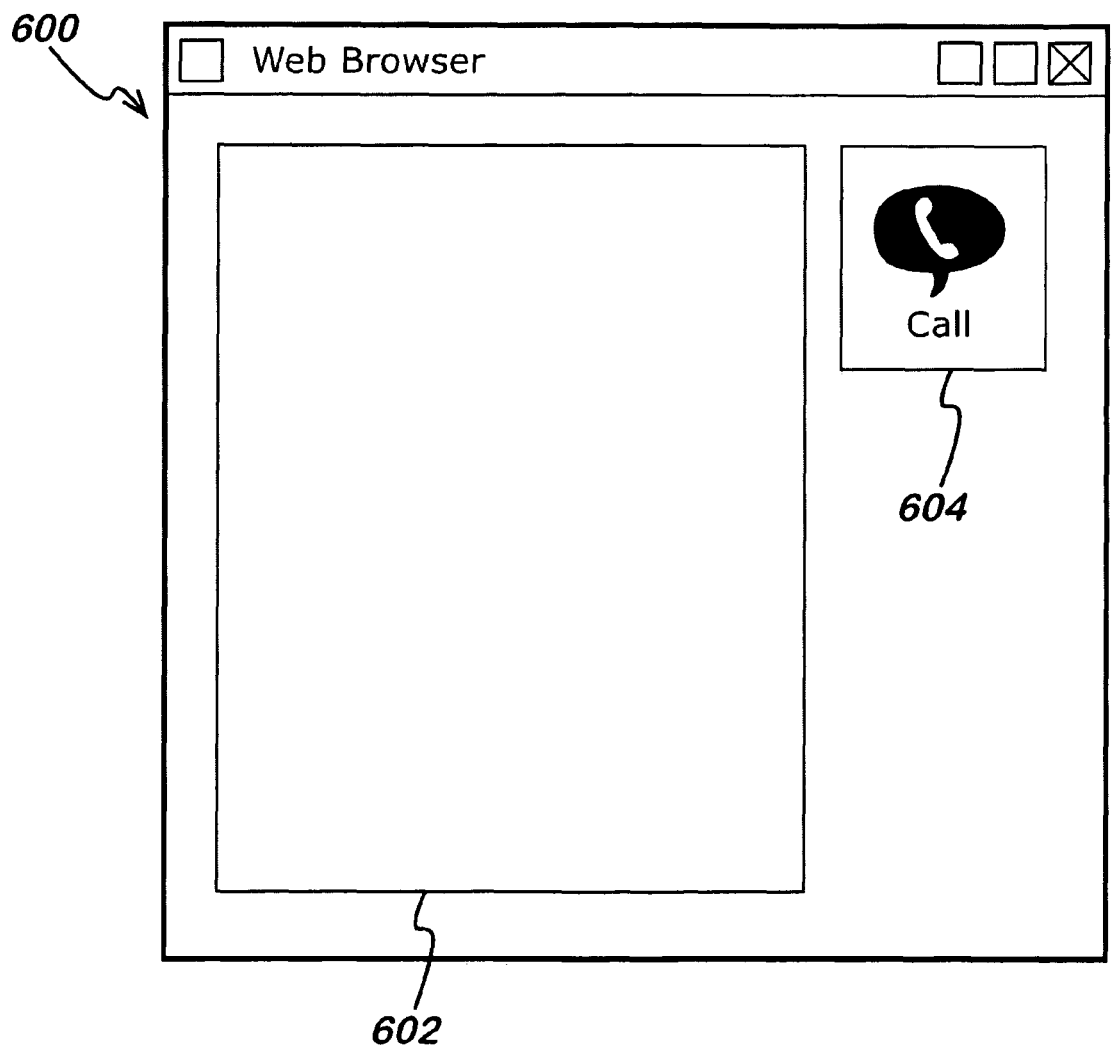
FIG. 6 shows a webpage with a call button.

The above-described embodiment therefore provides a technique by which a SIP terminal may be contacted via a P2P client, without the PSTN network being used. By registering the details of the SIP terminal with the operator of the service, the SIP terminal may be contacted for free by users of the P2P system. As mentioned, a call to the SIP terminal may be initiated from a button or link shown on a webpage. This is shown in the illustrative example in FIG. 6. The user terminal (102, 110) of users of the P2P system execute a web browser program (156, 158), and FIG. 6 illustrates a web browser window 600, as displayed in the display of the user terminal (102, 110). The web browser window 600 is displaying a website affiliated with an entity that has registered a SIP terminal in accordance with the above-described technique. The web browser window 600 may contain an information portion 602 comprising text and images, and also contains a hyperlinked "call" button 604. When the user of the user terminal 102, 110 activates button 604 shown in the web browser window, the P2P client 106, 112 initiates the call using the P2P ID embedded in the hyperlinked button 604.

While this invention has been particularly shown and described with reference to preferred embodiments, it will be understood to those skilled in the art that various changes in form and detail may be made without departing from the scope of the invention as defined by the appendant claims. In particular, whilst the above-described embodiment details techniques by which a SIP PBX may be contacted by a P2P system. However, it will be appreciated that these techniques may be more widely applicable to any type of SIP endpoint.

What is claimed is:

1. A method of establishing communication between a first and second terminal, said first terminal being arranged to communicate with a first communication system and said second terminal being arranged to communicate with a second communication system, comprising the steps of:
   a user of said second terminal selecting an identity to represent the second terminal in the first communication system and registering a network address of the second terminal at a first storage means;
   allocating to the second terminal a calling identifier from a set of available calling identifiers and mapping the network address to said calling identifier at the first storage means and mapping the identity to the calling identifier at a second storage means;
   a user of said first terminal initiating communication with said second terminal using said identity;
   said first terminal translating said identity to said calling identifier using said second storage means and transmitting a message to the first communication system to initiate communication with said second terminal using said calling identifier;
   responsive to receiving said message at a network node of the first communication system, said network node translating said calling identifier to said network address using said first storage means; and
   establishing a connection between said first terminal and said network node over the first communication system, and between said network node and said second terminal over the second communication system.

2. A method according to claim 1, wherein the first communication system is a peer-to-peer communication system.

3. A method according to claim 1, wherein the second communication system is a session initiation protocol communication system.

4. A method according to claim 1, wherein said step of initiating communication with said second terminal comprises the user of said first terminal activating a hyperlink containing said identity displayed on a display of said first terminal.

5. A method according to claim 1, wherein said step of initiating communication with said second terminal comprises the user of said first terminal selecting said identity shown in a contact list displayed on a display of said first terminal.

6. A method according to claim 1, wherein the calling identifier is an e.164 number.

7. A method according to claim 1, wherein the communication between the first and second terminal is a voice call.

8. A method according to claim 1, wherein said step of selecting an identity to represent the second terminal in the first communication system comprises the user of said second terminal viewing a website and entering said identity in said website.

9. A method according to claim 8, wherein said step of registering a network address of the second terminal at a first storage means comprises the user of the second terminal entering said network address in said website, and said website communicating said network address to said first storage means.

10. A system for establishing communication between a first and second terminal, said first terminal being arranged to communicate with a first communication system and said second terminal being arranged to communicate with a second communication system, comprising:
- means for selecting an identity to represent the second terminal in the first communication system and means for registering a network address of the second terminal at a first storage means;
- means for allocating to the second terminal a calling identifier from a set of available calling identifiers and means for mapping the network address to said calling identifier at the first storage means and means for mapping the identity to the calling identifier at a second storage means;
- said first terminal comprising means for initiating communication with said second terminal using said identity, means for translating said identity to said calling identifier using said second storage means and means for transmitting a message to the first communication system to initiate communication with said second terminal using said calling identifier; and
- a network node of the first communication system comprising means for translating said calling identifier to said network address using said first storage means responsive to receiving said message at the network node, and means for establishing a connection between said first terminal and said network node over the first communication system, and between said network node and said second terminal over the second communication system.

11. A system according to claim 10, wherein the first communication system is a peer-to-peer communication system.

12. A system according to claim 10, wherein the second communication system is a session initiation protocol communication system.

13. A system according to claim 10, wherein said means for initiating communication with said second terminal using said identity comprises a display means arranged to display a hyperlink containing said identity and a selection means, operable by a user of said first terminal, for activating said hyperlink.

14. A system according to claim 10, wherein said means for initiating communication with said second terminal using said identity comprises a display means arranged to display a contact list containing said identity and a selection means, operable by a user of said first terminal, for selecting said identity from said contact list.

15. A system according to claim 11, wherein the calling identifier is an e.164 number.

16. A system according to claim 11, wherein the communication between the first and second terminal is a voice call.

17. A system according to claim 11, wherein said means for selecting an identity to represent the second terminal in the first communication system comprises means for displaying a website to a user of said second terminal, said website being arranged to receive the identity entered by the user of said second terminal.

18. A system according to claim 17, wherein said means for registering a network address of the second terminal at a first storage means comprises means for entering said network address in said website, and means for communicating said network address from said website to said first storage means.

* * * * *